Patented Aug. 26, 1941

2,253,525

UNITED STATES PATENT OFFICE 2,253,525

OLEFIN REACTIONS WITH BORON FLUORIDE CATALYST

Donald John Loder, Wilmington, Del., assignor to E. I. du Pont de Nemours & Company, Wilmington, Del., a corporation of Delaware No Drawing. Application June 24, 1938, Serial No. 215,580

8 Claims. (Cl. 260—497)

This invention relates to a new catalyst for organic synthesis and more particularly to boron halide catalysts and is in part a continuation of my application Serial No. 46,875, filed October 26, 1935, U. S. Patent No. 2,158,031.

In the Friedel-Crafts reactions for the synthesis of aromatic hydrocarbons, ketones and triphenyl methane derivatives, anhydrous aluminum chloride or an analogous anhydrous halide such as boron fluoride, have been used as the condensing agents. These agents are used in comparatively large proportions as they form, in such reactions, well-defined addition compounds which are in many reactions considered to be the reactive agents. Due to the nature of the materials, the reaction is conducted under anhydrous conditions and recovery of the final products usually involves treatment of the reaction mixture with ice or ice and water. The aluminum halide and analogous halides are thus hydrated and the involved expensive steps required to reconvert them to the anhydrous form generally renders syntheses of this nature commercially unattractive.

An object of the present invention is to provide a new class of condensing or catalytic agents prepared from boron-halogen containing compounds. A further object of the invention is to provide a new and improved class of condensing agents particularly for reactions requiring an acid type condensing agent, such, for example, as: the interaction of alcohols with carbon monoxide to obtain acids and esters, the interaction of olefins and carbon monoxide to produce acids and esters, the interaction of organic acids with olefins to provide high molecular weight esters, and many of the reactions of the Friedel-Crafts type. A still further object of the invention is to provide hydrated boron halide catalysts for accelerating organic reactions of the above types. Other objects and advantages of the invention will hereinafter appear.

I have found that organic reactions such as the preparation of organic acids and their esters by the interaction of carbon monoxide with alcohols, ethers, esters, olefins and reactants which decompose to form such compounds, as well as the Friedel-Crafts type of reactions in which water is not detrimental, can be catalyzed with certain hydrated boron trihalides. These catalysts are particularly effective in reactions requiring superatmospheric pressures. They are also well fitted for catalyzing generally such organic condensation reactions in which water is not detrimental and which require an acidic type catalyst; they are especially adapted for reactions in which carbon monoxide is one of the reactants. A few of the reactions for which these catalysts are suitable include:

(1) Olefin+CO ⟶ acid and/or ester
(2) ROH+CO ⟶ RCOOH and/or HCOOR
(3) R₂O+CO+HOH ⟶ RCOOH and/or HCOOR and/or RCOOR
(4) RH+CO ⟶ RCOH
(5) 2H₂CO+CH₃.CH:CH₂ ⟶

CH₃CH.CH₂.CH₂
  |         |
  O         O
   \\      /
    CH₂

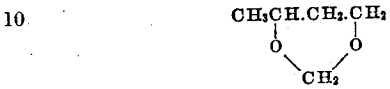

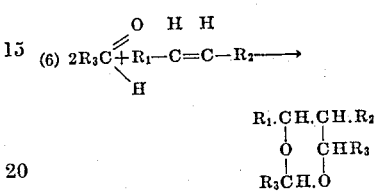

(7) CO+HOH ⟶ HCOOH
(8) RCOOH+olefin ⟶ ester
(9) Benzene+olefin ⟶ alkyl benzene
(10) Phenol+olefin ⟶ phenol ether and/or substituted phenol
(11) Phenol+RCOOH ⟶ phenyl alkyl ketone In the above reactions R may indicate an alkyl, aryl or aralkyl grouping. In Example 1 by utilizing ethylene as the olefin, acetic acid and/or ethyl acetate would be formed, and in Reaction 2 by substituting the alkyl group, CH₃ for R, methanol would be reacted with carbon monoxide to give acetic acid and/or methyl formate. In Reaction 4 by substituting the aryl, C₆H₅, for R, benzene would react with CO to form benzaldehyde. Moreover, alcohols and more specifically the lower aliphatic monohydric alcohols may likewise be reacted with olefins in accord with this invention to give ethers.

My preferred condensing agents for reactions such as those illustrated above and their equivalents are the boron trihalides associated with water in the ratio ranging preferably from one to five mols per mol of boron trihalide. More specifically they include the boron trihalides associated with water as a mono-, di-, tri-, and quatrihydrate of the trichloride, trifluoride, tribromide, or triiodide of boron. Furthermore, as the boron trihalides form intermediate products which may be designated as intermediate hydrates between those definitely stated above, it is understood that such hydrates are likewise suitable as condensing agents.

It has been stated heretofore that the principal difficulty encountered in the use of anhydrous halides, and more particularly aluminum halide, arose from the necessary destruction of the condensing agent prior to the recovery of the products of the reaction. An additional difficulty in the use of such agents is encountered in handling the anhydrous agents and maintaining them in the anhydrous form. The condensing agents of the present invention can be readily separated by distillation, extraction, decantation or by other means from the reaction products and the recovered agents, generally without the necessity of purification, can be reused directly to accelerate another reaction. The striking advantages of these recoverable highly reactive condensing agents over the anhydrous condensing agents are self-evident.

Generally the condensing agents may be prepared by reacting a liquid halogen acid with a boric acid. For example, three mols of liquid hydrofluoric acid may be reacted with one mol of solid orthoboric acid to give the liquid trihydrate of boron trifluoride or three mols of liquid hydrofluoric acid may be reacted with one-half a mol of metaboric acid to give the dihydrate of boron trifluoride.

I shall now describe more specifically methods of preparing the condensing agent of the invention and also processes in which they may be used but it will be understood that the details therein given will not limit the scope of the invention.

*Example 1.*—1696 parts by weight of solid orthoboric acid are placed in a suitable pressure sustaining receptacle and 1643 parts by weight of liquid hydrofluoric acid are added thereto. The temperature of the exothermic reaction is kept at approximately 10° C., and when the reaction of the hydrofluoric acid with the boric acid is complete a liquid, fairly mobile trihydrate of boron trifluoride, having a specific quantity of 1.500 to 20° C., is obtained.

*Example 2.*—468 parts by weight of liquid hydrofluoric acid are combined as in Example 1 with 175 parts by weight of metaboric acid. The liquid catalyst obtained is apparently a dihydrate of boron trifluoride having a specific gravity of 1.625 at 20° C.

As has already been emphasized the condensing agents of the present invention may be utilized in a number of reactions and are most advantageously employed in condensation reactions in which water is not detrimental. I shall now give several examples illustrating types of processes in which my preferred condensing agents are employed, but the utility of the catalysts is not limited by or to these processes.

*Example 3.*—205 parts by weight of the trihydrate of boron trifluoride obtained as described in Example 1 are placed in a pressure resisting autoclave and 54 parts by weight of methanol added. The autoclave is closed and carbon monoxide is added to the mixture contained therein until a pressure of approximately 900 atmospheres is attained. The temperature is held at approximately 260° C., and the reaction is continued until analysis shows that an equivalent weight of carbon monoxide has reacted with the methanol present. The pressure is released and the acetic acid distilled from the reaction mixture, steam being added during the distillation to maintain a fairly constant water to boron trifluoride ratio. A 79% yield of acetic acid was obtained when this reaction was conducted under the above conditions.

*Example 4.*—A mixture of 64 parts by weight of methanol and 175 parts by weight of the catalyst prepared in accord with the directions given in Example 2 was charged into a pressure shaker tube. The mixture was heated to 240–250° C., under a CO pressure of approximately 900 atmospheres for about 1¼ hours during which a pressure drop of approximately 570 atmospheres occurred. The tube was cooled, the pressure discharged, and the product again heated to 160° C., under cylinder ethylene pressure for approximately ⅔ of an hour during the course of which treatment a considerable pressure drop occurred. After cooling, the product was discharged and distilled directly giving a volume of crude ethyl acetate of 58.8 parts by weight having a boiling range of 61–72° C. The distillation was continued and acetic acid and an acetic acid-boron fluoride addition compound condensed in the distillate.

*Example 5.*—Ethanol was reacted according to the conditions and procedure given in Example 1 with a yield of 45–50% of the amount of propionic acid which is theoretically obtainable according to the equation:

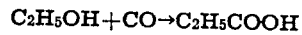

$$C_2H_5OH + CO \rightarrow C_2H_5COOH$$

*Example 6.*—Formalin, 172 parts by weight, was caused to absorb 150 parts of boron fluoride gas. The resulting mixture absorbed propylene at from 0° C.–20° C., and one atmosphere pressure, forming a product which, when made alkaline, and distilled, yielded a series of formals. The lower boiling products (distilling at 30° to 123° C.,) were separated by salting out; the material distilling over below 100° C., was purified by redistillation and the boiling point of the chief constituent, butylene glycol cyclic formal, was 113–114.3° C. The higher boiling formals were obtained by continuing the distillation and collecting fractions between 123° and 250° C. Still higher boiling compounds remained in the residue. The yield of the low boiling products, obtained in the salting out process was 56 parts by weight and the yield of products boiling 123° C. to 250° C., was 15 parts by weight.

*Example 7.*—100 parts of a complex containing 2 mols of acetic acid per mol of $BF_3$ and 20 parts of benzoyl peroxide were charged into a glass pressure shaker tube. Propylene, which was introduced to give a pressure of 25 to 30 pounds per square inch, was rapidly absorbed. The heat of the reaction increased the temperature to 30 to 35° C. Propyl acetate was recovered from the reaction product in good yield.

*Example 8.*—125 parts of $(CH_3COOH)_2BF_3$ was charged into a pressure tube and ethylene added to build up a pressure of 800 pounds per square inch. Over a period of 3½ hours the temperature increased from 94° C. to 153° C. 147 parts of product was recovered which upon analysis gave a 40% conversion of the acetic acid to ethyl acetate.

My condensing agents may be used in various proportions which are governed by the type of reaction. In the absence of addition agents such as metal oxides or powdered metals, for example, nickel and nickel oxides, they may be used in proportions ranging from 0.25 to 2.0 mol or higher calculated on the boron halide present per mol of the major reactant while in the presence of addition agents much lower amounts may be employed, say, generally, from 1 to 5% and, in some instances, higher percentages may be required. The activity of the addition agent determines in large measure the amount required, the particular reaction as well as the temperature and pressure conditions employed also being considered.

As indicated in the examples the reactions herein involve the addition of one compound to another to form a third compound. Accordingly it will be understood that when the words "condense," "condensing," and "condensation" are used herein, they designate such reactions which are well illustrated by the equations given above.

From a consideration of the above specification it will be realized that many changes may be made in the catalysts herein described and the method of their preparation without departing from the invention or sacrificing any of the advantages that may be derived therefrom.

I claim:

1. In a liquid phase process involving an organic condensation reaction of an olefin with a member of the group consisting of lower aliphatic monohydric alcohols and lower fatty acids, respectively, the steps which comprise effecting the reaction in the presence of boron trifluoride associated with from one to five mols of water per mol of boron trifluoride and recovering from the products of the reaction boron trifluoride associated with water.

2. In a liquid phase process involving an organic condensation reaction of an olefin with a member of the group consisting of lower aliphatic monohydric alcohols and lower fatty acids, respectively, the steps which comprise effecting the reaction in the presence of a dihydrate of boron trifluoride and recovering from the products of the reaction boron trifluoride associated with water.

3. In a liquid phase process involving an organic condensation reaction of an olefin with a member of the group consisting of lower aliphatic monohydric alcohols and lower fatty acids, respectively, the steps which comprise effecting the reaction in the presence of a trihydrate of boron trifluoride and recovering from the products of the reaction boron trifluoride associated with water.

4. A liquid phase process which comprises effecting the reaction between a lower fatty acid and an olefin in the presence of boron trifluoride associated with from one to five mols of water per mol of boron trifluoride and recovering from the products of the reaction boron trifluoride associated with water.

5. A liquid phase process which comprises effecting the reaction between a lower fatty acid and an olefin in the presence of a dihydrate of boron trifluoride and recovering from the products of the reaction boron trifluoride associated with water.

6. A liquid phase process which comprises effecting the reaction between a lower fatty acid and an olefin in the presence of a trihydrate of boron trifluoride and recovering from the products of the reaction boron trifluoride associated with water.

7. A process of preparing ethyl acetate which comprises effecting the reaction between acetic acid and ethylene in the presence of a boron trifluoride dihydrate catalyst.

8. A process of preparing propyl acetate which comprises effecting the reaction between acetic acid and propylene in the presence of a boron trifluoride dihydrate catalyst.

DONALD JOHN LODER.